United States Patent [19]
Conradt

[11] Patent Number: 4,725,028
[45] Date of Patent: Feb. 16, 1988

[54] COLLAPSIBLE/EXPANDABLE TRIVET

[76] Inventor: Kurt Conradt, 4251 Irving Park Rd., Chicago, Ill. 60641

[21] Appl. No.: 901,836

[22] Filed: Aug. 29, 1986

[51] Int. Cl.$^4$ .............................................. A47G 23/02
[52] U.S. Cl. ..................................... 248/150; 248/346
[58] Field of Search ...................... 248/150, 146, 346; 16/116 R; 211/202; 99/346 R

[56] References Cited
U.S. PATENT DOCUMENTS

| | | | |
|---|---|---|---|
| D. 181,764 | 12/1957 | Togt | D7/388 |
| D. 194,547 | 2/1963 | Satell | D7/388 |
| D. 265,790 | 8/1982 | Taylor | D7/388 |

FOREIGN PATENT DOCUMENTS 2411593  12/1977  France ................................. 248/150

*Primary Examiner*—J. Franklin Foss
*Attorney, Agent, or Firm*—Thomas R. Vigil

[57] ABSTRACT

The expandable/collapsible trivet is adapted for use in holding a container or other item a predetermined distance above a horizontal supporting surface. The trivet comprises a lazy tongs mechanism including a plurality of pivotally interconnected strut members which define a top bearing surface and a bottom surface, and a plurality of legs extending from the bottom surface at some of the intersections of the strut members for supporting the lazy tongs mechanism above a horizontal supporting surface.

3 Claims, 7 Drawing Figures

COLLAPSIBLE/EXPANDABLE TRIVET

BACKGROUND OF THE INVENTION

1. Field of the Invention

The present invention relates to a trivet and in particular to a trivet which has movable members to create an expandable/collapsible rack much like lazy tongs or a pantagraph mechanism which is supported a predetermined distance above a supporting surface by rotatable pins.

2. Description of the Prior Art

Heretofore various rack type structures have been proposed for holding a hot plate or pan elevated above a horizonal supporting surface. Examples of these prior art structures are disclosed in the following patents:

| U.S. Pat. No. | Patentee |
|---|---|
| Des. 181,764 | van der Togt |
| Des. 194,547 | Satell |

The van der Togt U.S. Pat. No. Des. 181,764 discloses an ornamental design for a lazy tongs trivet, the trivet being multilayered and rather ornate. From the drawing of van der Togt, the trivet does not appear to be collapsible.

The Satell U.S. Pat. No. Des. 194,547 discloses an ornamental design for a hot dish holder. Here also it does not appear from the drawing of the dish holder that this dish holder is collapsible.

Also, there have been proposed in non-analogous arts various expandable/rack type structures. See for example the following U.S. patents:

| U.S. Pat. No. | Patentee |
|---|---|
| 1,079,385 | Atkinson |
| 1,138,498 | Moore |
| 4,497,413 | Tocci |

The non-analogous Atkinson U.S. Pat. No. 1,079,385 discloses a complex, collapsible stand made of bars pivotably connected in the form of lazy tongs and layered transverse shelflike members also made of pivotally connected bars arranged in the form of lazy tongs, with all the members being pivotally connected with one another in such a manner that the stand may be collapsed, folded and compressed in width as well as in height so as to render the stand reducible as a whole to a small compact body. Particular means are provided for locking the members in the extended state, such as when arranged for use as a stand, and brace bars are provided for imparting rigidity to the stand when arranged for supporting articles. From FIGS. 2 and 3 of the Atkinson patent is seen that the collapsible stand is a multilevel stand and that various structures are provided to provide support for the various shelflike members of the stand.

The non-analogous Moore U.S. Pat. No. 1,138,498 discloses a folding grate which includes a lazy tongs structure for the top, and legs pivotably secured thereto which are so arranged that when the top is collapsed and the legs folded thereagainst, the top will be held against accidental extension. Here the lazy tongs device is provided with end bars having alternately arranged downwardly extending flanges which, when the legs are pivoted toward the flanges, or folded, will engage the opposite flange or bar and hold the lazy tongs in such collapsed state. Also, in the Moore folding grate, in order to prevent spreading of the legs to too great an extent, the lower end bars are provided with rounded upper extremities which are adapted to engage the undersurfaces of upper end bars and thus limit the extension of the grate. Also, this lazy tongs folding grate can only be folded in one dimension, due to the construction of the grate described above.

The non-analogous Tocci U.S. Pat. No. 4,497,413 discloses a rack structure including a novel pivot joint which comprises a pair of superimposed elongate plastic members having through-open barrels of different sizes, one in the other, and a plastic pin with a button on a reduced portion extending through the combined barrels and securing all three members together in a pivot relation. Such pivot structure is best illustrated in FIG. 2 of this patent and the rack is utilized as an expanding rack for hanging garments thereon, the pin fasteners acting to form garment hangers.

As will be described in greater detail hereinafter, none of the prior art structures described above disclose or suggest a collapsible/expandable trivet of the present invention, the trivet being compressible in either the length or bredth dimension thereof and utilizing pins which act as legs for the trivet to rotatably fix various joints and utilizing rivet caps at other junctions or joints between the frame members in a lazy tongs or a pantagraph mechanism.

SUMMARY OF THE INVENTION

According to the present invention there is provided an expandable/collapsible trivet for use in holding a container or other item a predetermined distance above a horizontal supporting surface comprising:

a lazy tongs mechanism including a plurality of pivotally interconnected strut members which define a top bearing surface and a bottom surface, and a plurality of legs extending from said bottom surface at some of the intersections of said strut members for supporting said lazy tongs mechanism above a horizontal support surface, said lazy tongs mechanism when expanded to form rhombus or square spaces within the envelope of interconnecting strut members thereof having a generally rectangular configuration and being foldable inwardly between either pair of rectangular sides of said expanded lazy tongs mechanism.

DESCRIPTION OF THE PREFERRED EMBODIMENT

Figure 1:
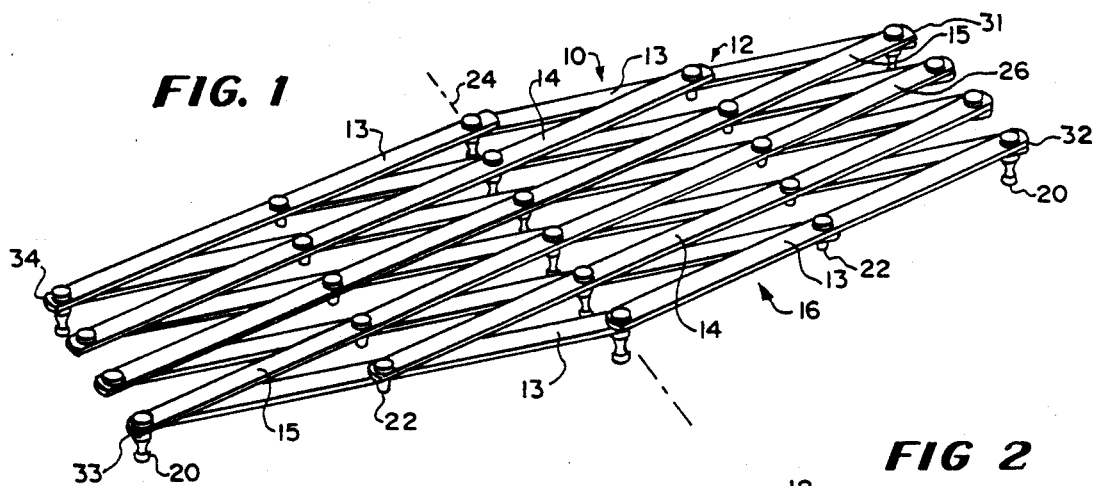
FIG. 1 is a perspective view of the trivet of the present invention in a partially expanded state.

Referring to the drawings in greater detail, there is illustrated in FIG. 1 a perspective view of a collapsible/expandable trivet 10 constructed according to the teachings of the present invention. The trivet 10 comprises a plurality 12 of strut members 13, 14 and 15 which are pivotally connected together at each point of intersection of two strut members 13, 14 or 15 so as to form a lazy tongs or pantagraph mechanism 16. The strut members 13, 14 and 15 are preferably made of metal or any other material which will not be damaged by heat.

The strut members 13, 14 or 15 are pivotally connected to each other at spaced apart intersections of strut members 13, 14 or 15 by rivets 18 which are capped with pins 20 or caps 22. The pins 20 form legs upon which the trivet 10 stands. The rivet caps 22 merely cap the respective rivets 18 without pins 20 at pivot connections of the strut members 13, 14 or 15.

Figure 2:
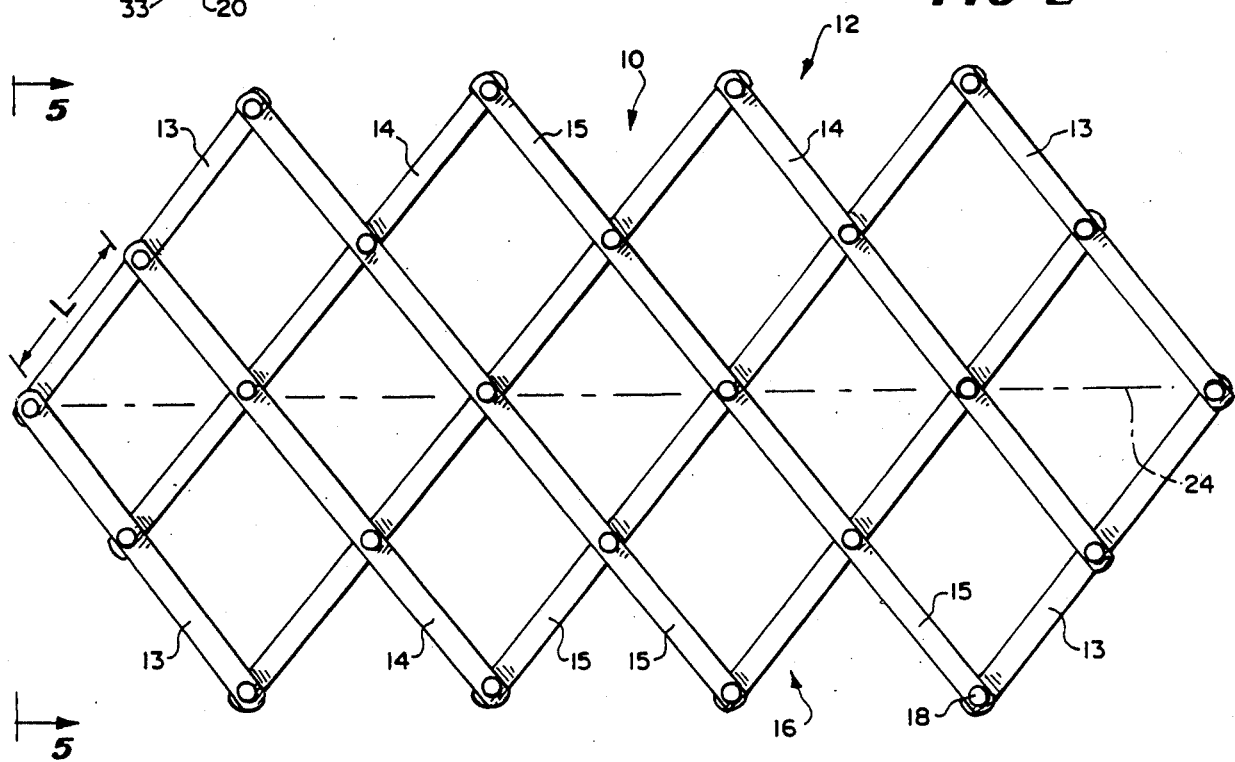
FIG. 2 is a top plan view of the trivet of the present invention in an extended position for use.

In the illustrated embodiment, the pins 20 are located along a centerline 24 of the lazy tongs mechanism 16 and at corners 31, 32, 33 and 34 of the generally rectangular, expanded trivet 10 shown in FIG. 2.

Figure 5:
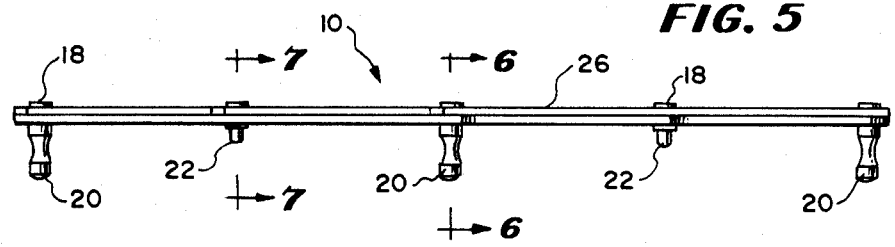
FIG. 5 is a end edge elevational view of the trivet shown in FIG. 1, shows rivets at the intersection of the strut members of the trivet, shows pins from legs of the trivet fixed to some of the rivets, and is taken along line 5—5 of FIG. 2.

Referring now to FIG. 2, there is illustrated therein a top plan view of the collapsible/expandable trivet 10 illustrated in FIG. 1. As shown in FIG. 5, a top bearing surface 26 of the trivet 10 is defined by the expanded trivet 10. In FIG. 2 there are shown four strut members 13, four strut members 14 and four strut members 15. The length of each strut member 13, 14 or 15 depends on its position within the pantagraph. As shown, strut members 13 have a length of 2L, strut members 14 have a length of 3L and strut members 15 have a length of 4L where L is the length of each side of each rhombus or square formed within the envelope defined by the expanded lazy tong mechanism 16. When the trivet 10 is in the expanded position, and positioned on a planar surface, it has the formation of lazy tongs or a pantagraph mechanism 16 with the intersections between the strut members 13, 14 and 15 being pivotally connected together with the rivets 18, which will be described in greater detail hereinafter.

Figure 3:
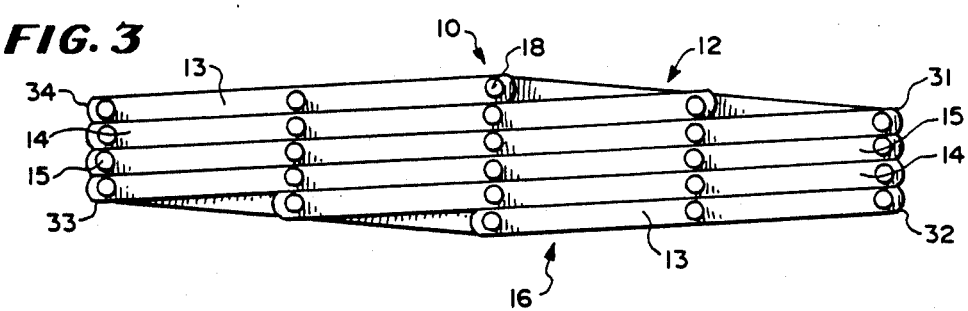
FIG. 3 is a top plan view of the trivet shown in FIG. 1 and shows it in a totally collapsed position along the bredth of the trivet.

Turning now to FIG. 3, there is illustrated therein a top plan view of the trivet 10 illustrating one possible collapsed state of the trivet 10. In this view, the trivet 10 has been collapsed in a lengthwise direction, with an upper set of strut members 13, 14 and 15 in a side by side engagement thus forming a somewhat rectangular compact collapsed trivet 10.

Figure 4:
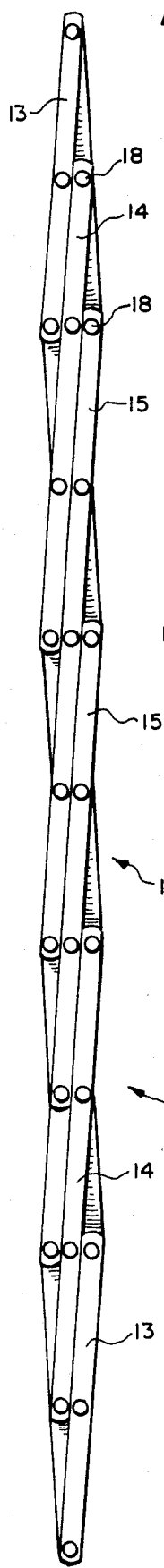
FIG. 4 is a top plan view of the trivet shown in FIG. 1 and shows the trivet in a totally collapsed position collapsed along the length of the trivet.

Alternatively, as shown in FIG. 4, the trivet 10 may be collapsed in a bredth-or-width wise manner which will produce an elongate, rather narrow collapsed trivet 10.

Turning now to FIG. 5, there is illustrated therein an edge view of the trivet 10. As shown, some rivets 18 are capped by a pin 20 to form peripheral and central legs 20 for the trivet 10, while opposite other rivets 18 are capped by a rivet cap 22, solely for connecting the intersecting strut members 13, 14 or 15 together in a pivotable manner.

Figure 6:
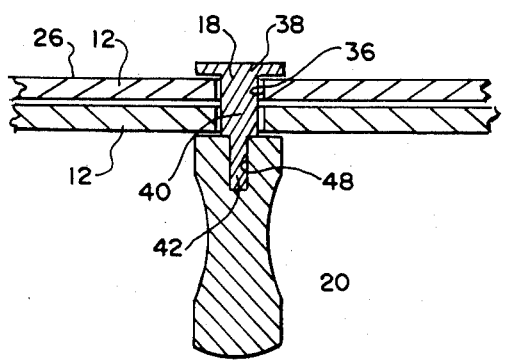
FIG. 6 is an enlarged sectional view through one of the rivets fixed to one of the pins of the trivet and is taken along line 6—6 of FIG. 5.

In FIG. 6, there is illustrated an enlarged cross-sectional view through one of the legs or pins 20 utilized in supporting the trivet 10 when placed on a horizontal surface. As illustrated, the strut members 13, 14 and 15 have predrilled bores 36 at points of intersection (FIG. 2) and within each bore 36 is positioned a rivet 18. As illustrated, each rivet 18 includes a cap portion 38, a bearing portion 40 around which intersecting strut members 13, 14 or 15 can pivot, and a smaller-in-diameter pin section 42 over which a pin 20 or cap 22 is received.

Each pin section 42 is received in a friction fit within a bore 48 in a pin 20 or in a bore 50 in a cap 22.

Once a pin 20 is attached to a rivet 18 in the manner shown in FIG. 6, it will provide a freely rotatable support leg 20 for the trivet 10 to maintain the trivet 10 a predetermined distance above a horizontal surface on which it is placed. By the provision of such legs 20 on the trivet 10, a "dead space" is provided beneath the trivet 10 so that one may place a hot container (not shown), such as a pot or pan, upon the trivet 10, and keep the surface of the horizontal structure on which the trivet 10 is placed from becoming burned or scorched by the heat given off by the pot or pan.

Figure 7:
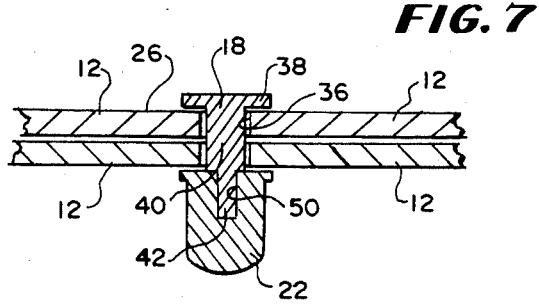
FIG. 7 an enlarged sectional view through one of the capped rivets of the trivet and is taken along line 7—7 of FIG. 5.

In FIG. 7, there is illustrated an enlarged cross-sectional view through one of the caps 22 utilized in forming the rotatable, non-supporting pivot connection of the strut members 13, 14 or 15 of the trivet 10. The cap 22 is relatively short as compared to a pin 20 and as with the pin 20, has a bore 50 for receiving a pin section 42 of a rivet 18 in a tight friction fit.

It is preferable in the formation of the trivet 10 to place the pins or legs 20 at intersections of the strut members 13, 14 or 15 which will form the corners 31-34 of the trivet 10 and which are along the centerline 24 and to utilize rivet caps 22 at the other intersections.

In order to provide a support for the central portion of the trivet 10, pins/legs 20 are provided along the centerline 24 of the trivet 10 so that a sag is not developed when weight is placed on the top bearing surface 26.

Also, although the trivet 10 is illustrated as being made of four strut members 13, four strut members 14 and four strut member 15, the trivet 10 can be made with more strut members 13, 14, 15 or less strut members 13, 14, 15, e.g., four strut members 13 and four strut members 14 or four strut members 13, four strut members 14 and two strut members 15.

From the foregoing description, it will be understood that modifications can be made to the trivet 10 without departing from the teachings of the present invention.

Accordingly, the scope of the present invention is only to be limited as necessitated by the accompanying claims.

I claim:

1. An expandable/collapsible trivet for use in holding a hot container or other item a predetermined distance above a horizontal supporting surface comprising:

a lazy tongs mechanism including a plurality of pivotally interconnected strut members which define a top bearing surface and a bottom surface, and a plurality of freely rotatable legs each comprising a metal rivet and a metal pin frictionally mounted on a free end of said rivet and each pin extending from said bottom surface at each end corner forming intersection of said strut members and at at least two intersections which are centrally located along a line extending from one end of the trivet to the other end of the trivet along the longest dimension thereof for supporting said lazy tongs mechanism above a horizontal support surface, a metal rivet and a metal cap member connected to each rivet at each other intersection of said struts not mounting a leg, said lazy tongs mechansim when expanded to form rhombus or square spaces within the envelope of interconnecting strut members thereof having a generally rectangular configuration and being foldable inwardly between either pair of rectangular sides of said expanded lazy tongs mechanism to a narrow elongate collapsed condition and said tongs mechansim including at least eight strut members, four strut members having a length 2L and four strut members having a length 3L where L is the length of a side of each rhombus or square formed by the expanded lazy tongs mechanism.

2. The trivet of claim 1 wherein said lazy tong mechanism includes at least ten strut members, four strut members having a length 2L, four strut members having a length 3L and two strut members having a length 4L where L is the length of a side of each rhombus or square formed by the expanded lazy tongs mechanism.

3. The trivet of claim 1 wherein said lazy tong mechansim includes at least twelve strut members, four strut members having a length 2L, four strut members having a length 3L and four strut members having a length 4L where L is the length of a side of each rhombus or square formed by the expanded lazy tongs mechanism.

* * * * *